(12) United States Patent
Simon

(10) Patent No.: US 7,327,146 B2
(45) Date of Patent: Feb. 5, 2008

(54) PROBE FOR MEASURING THE ELECTROMAGNETIC PROPERTIES OF A DOWN-HOLE MATERIAL

(75) Inventor: Matthieu Simon, Montrouge (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 126 days.

(21) Appl. No.: 11/282,084

(22) Filed: Nov. 17, 2005

(65) Prior Publication Data
US 2006/0108112 A1 May 25, 2006

(30) Foreign Application Priority Data
Nov. 24, 2004 (EP) ................... 04292786

(51) Int. Cl.
  *G01V 3/18* (2006.01)
  *G01V 3/00* (2006.01)
(52) U.S. Cl. ................ 324/355; 324/324; 324/347
(58) Field of Classification Search ........ 324/324, 324/338, 347, 351, 355, 357; 342/22; 702/6, 702/7, 11
See application file for complete search history.

(56) References Cited

U.S. PATENT DOCUMENTS

| 3,660,754 | A | | 5/1972 | Tsao et al. |
| 4,511,842 | A | | 4/1985 | Moran et al. |
| 4,626,773 | A | * | 12/1986 | Kroeger et al. ............. 324/642 |
| 4,652,829 | A | | 3/1987 | Safinya et al. |
| 4,817,711 | A | * | 4/1989 | Jeambey ..................... 166/248 |
| 5,475,309 | A | | 12/1995 | Hong et al. |

OTHER PUBLICATIONS

Kansas Geological Survey, Modeling Dielectric-Constant Values of Geologic Materials, Dec. 2001, Web publication, all pages.*
Iskander et al., A Time-Domain Technique for Measurement of the Dielectric Properties of Oil Shale During Processing, Jun. 1981, IEEE vol. 69, No. 6, pp. 760-762.*

* cited by examiner

*Primary Examiner*—Reena Aurora
*Assistant Examiner*—Kenneth J Whittington
(74) *Attorney, Agent, or Firm*—Kevin P. McEnaney; Dale Gaudier

(57) ABSTRACT

A probe 1 for measuring the electromagnetic properties of a down-hole material MC, GF, DM of a well-bore WB comprises a metallic pad 2 in contact with the down-hole material. The pad 2 further comprises an open-ended coaxial wire 4 coupled to an electronic circuit 3. The open-ended coaxial wire 4 comprises an inner conductor 4A sunk in an insulator 4B and is positioned sensibly perpendicularly to the well-bore wall. The electronic circuit 3 is able to send a high-frequency input signal into the open-ended coaxial wire 4 and to determine a reflection coefficient based on a high-frequency output signal reflected by the open-ended coaxial wire 4.

14 Claims, 3 Drawing Sheets

PROBE FOR MEASURING THE ELECTROMAGNETIC PROPERTIES OF A DOWN-HOLE MATERIAL

CROSS REFERENCE TO RELATED APPLICATION

This application claims priority to European Patent Application 04292786.3 filed on Nov. 24, 2004.

FIELD OF THE INVENTION

The invention relates to a probe for measuring the electromagnetic properties of a material. The invention finds an application in the oilfield industry, in particular for measuring the dielectric properties, namely permittivity and conductivity of a down-hole material, in particular a geological formation, a drilling mud or a mudcake.

The invention also relates to a method for measuring the electromagnetic properties of a down-hole material at microwave frequencies.

BACKGROUND OF THE INVENTION

It is usual in the oilfield industry to perform various measurements during a well-bore drilling operation. Such measurements are known as measurements-while-drilling (MWD) or logging while drilling (LWD). These measurements relates to well-bore characteristics and to the properties of the geological formation run across during the excavation of the hole, or shortly thereafter. The measurements are performed by tools integrated into a bottom-hole assembly, in particular into a drill-string. The measurements-while-drilling tool typically provides pressure, temperature and well-bore trajectory in three-dimensional space. The logging while drilling tool typically provides geological formation parameters (resistivity, porosity, sonic velocity, gamma ray . . . ). These measurements are performed while extending the well-bore. The measurements which are made down-hole can be stored in a memory and later transmitted to the surface (e.g. data transmission through pressure pulses, later retrieval with wire-line, or retrieval when the tool is tripped out of the hole).

It is also usual in the oilfield industry to perform various measurements after the well-bore drilling operation has been carried out. Such measurements are known as wire-line logging. The wire-line logging employs an electrical cable to lower tools into the borehole and to transmit data measured down-hole to surface equipment. The measurements relates to well-bore characteristics (pressure, temperature, drilling fluid . . . ) and to the properties of the geological formation around the well-bore (resistivity, porosity, sonic velocity, gamma ray . . . ) versus depth or time, or both.

While various well-bore characteristics can be measured, there is currently a need of measuring the dielectric properties, namely permittivity and conductivity of the down-hole material, in particular the geological formation or the drilling mud or the mudcake, in the close vicinity of the well-bore wall.

SUMMARY OF THE INVENTION

One goal of the invention is to propose a probe for measuring the electromagnetic properties of a down-hole material at microwave frequencies, in the close vicinity of the well-bore wall and a corresponding measuring method.

According to the invention, a probe for measuring the electromagnetic properties of a down-hole material of a well-bore comprises a metallic pad in contact with the down-hole material. The pad further comprises an open-ended coaxial wire coupled to an electronic circuit, said open-ended coaxial wire comprising an inner conductor sunk in an insulator and being positioned sensibly perpendicularly to a well-bore wall, the electronic circuit being able to send a high-frequency input signal into the open-ended coaxial wire and to determine a reflection coefficient based on a high-frequency output signal reflected by the open-ended coaxial wire.

The down-hole material may be a mudcake, a drilling mud or a geological formation.

Advantageously, the open-ended coaxial wire and the electronic circuit are coupled to a self-calibration arrangement by means of a first switch.

The self-calibration arrangement comprises a second coaxial wire sensibly identical to the open-ended coaxial wire, the second coaxial wire being connected by a second switch to a first termination having a first impedance, a second termination having a second impedance and a third termination having a third impedance.

For example, the first termination is a short termination, the second termination is an open termination and the third termination has a determined impedance.

The invention also relates to a logging tool comprising a probe for measuring the electromagnetic properties of a down-hole material of a well-bore according to the invention, the pad of the probe being coupled to the tool by at least one arm, said logging tool receiving a signal representative of the electromagnetic properties of the down-hole material measured by the probe.

Finally, the invention relates to a method for measuring the electromagnetic properties of a down-hole material of a well-bore. The method comprises the steps of:
  positioning an open-ended coaxial wire in contact with the down-hole material,
  sending a high-frequency input signal into the open-ended coaxial wire in contact with the down-hole material,
  measuring a high-frequency output signal reflected by the open-ended coaxial wire,
  measuring a reflection coefficient based on the high-frequency output signal,
  calculating a dielectric value related to the down-hole material based on the reflection coefficient, and
  repeating the above steps at different points along the well-bore wall.

Optionally, the method further consists in repeating the input signal sending step, the output signal and reflection coefficient measuring steps and the dielectric value calculating step at least for an input signal of another high-frequency at a sensibly identical point along the well-bore wall.

The method may further comprise a calibration step of an electronic circuit coupled to the open-ended coaxial wire, which is performed at a determined time interval. Advantageously, the calibration step consists in successively connecting the electronic circuit to at least three different impedances and measuring the reflected high-frequency output signal.

With the measuring probe, tool and method of the invention, the permittivity and conductivity of the down-hole material, i.e. geological formation, drilling mud or mudcake is measured with a great accuracy (for example an accuracy better than 1% can be obtained).

In addition, the measurement of the permittivity and conductivity of the drilling mud enables to obtain information about the properties of the invasion fluids.

Finally, the measurement of the permittivity and conductivity of the down-hole material can be performed at different frequencies, enabling to obtain petrophysical information about the down-hole material (e.g. information pertaining to particle shape, wettability, etc. . . . ).

BRIEF DESCRIPTION OF THE DRAWINGS

The present invention is illustrated by way of example and not limited to the accompanying figures, in which like references indicate similar elements.

DETAILED DESCRIPTION OF THE INVENTION

Figure 1:
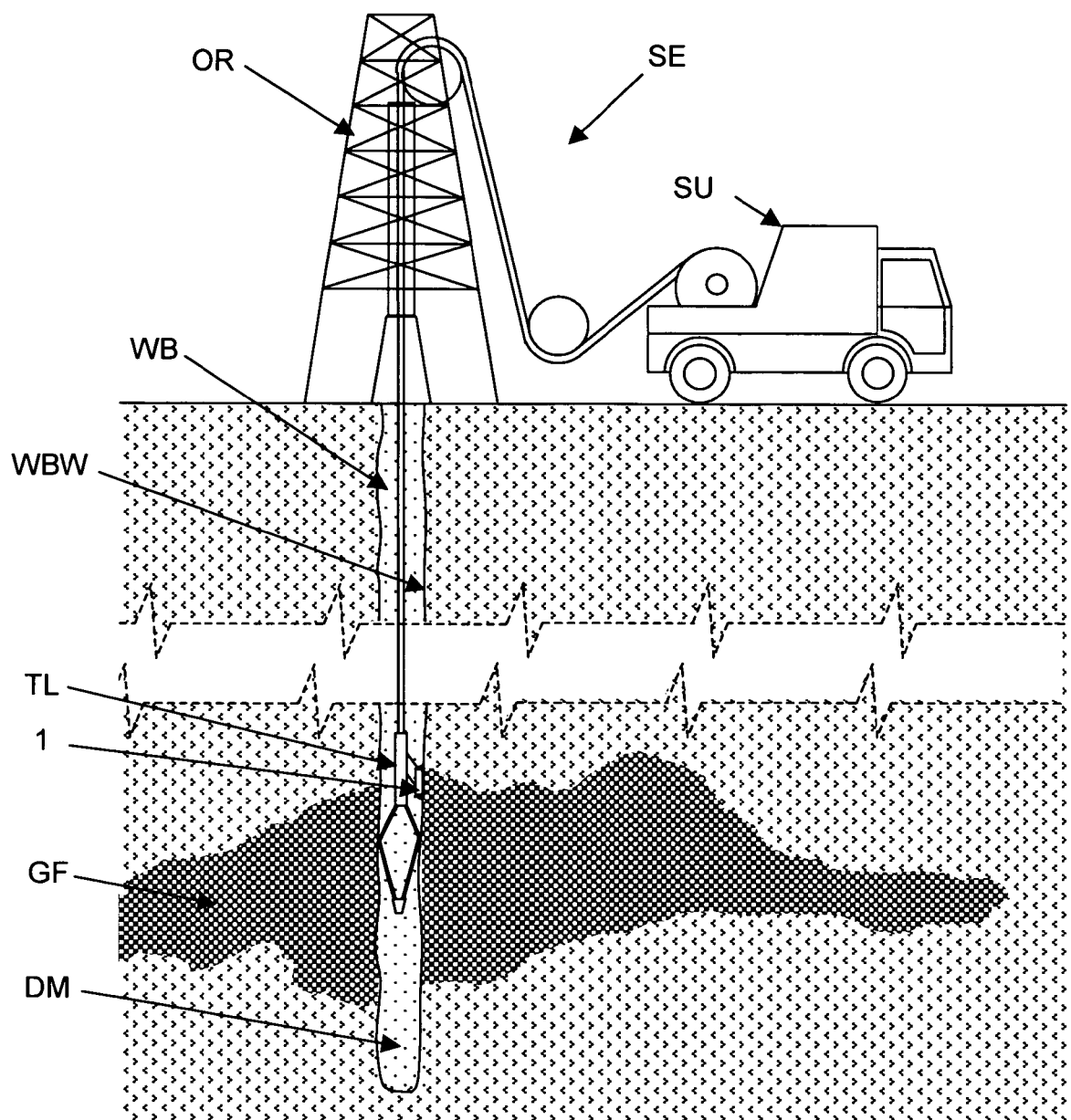
FIG. 1 schematically illustrates a typical onshore hydrocarbon well location.

FIG. 1 schematically shows a typical onshore hydrocarbon well location and surface equipments SE above a hydrocarbon geological formation GF after drilling operation has been carried out. At this stage, the well-bore WB is a bore-hole generally filled with various fluid mixtures (e.g. the drilling mud DM or the like). The surface equipments SE comprises an oil rig OR and a surface unit SU for deploying a logging tool TL in the well-bore WB.

The logging tool comprises a centralizer that comprises a plurality of mechanical arm connected to the logging tool and to a bottom nose. The mechanical arm can be deployed radially so as to be in contact with the well-bore wall, insuring a correct positioning of the tool within the well-bore (e.g. along the central axis of the well-bore). The logging tool comprises various sensors or probes that provide various measurement type data related to the hydrocarbon geological formation GF or to the well-bore WB. The logging tool TL is coupled to the surface unit SU (for example a vehicle comprising a deploying system and a measurement data collection and analysis computer and software).

The logging tool TL comprises among others sensors and probes, a probe 1 for measuring the electromagnetic properties (dielectric properties) of the down-hole material, namely the permittivity and the conductivity of the formation GF, of the drilling mud DM or of the mudcake MC. The terminology "geological formation" corresponds to a drilling mud invaded zone, namely a volume or a flushed zone close to the well-bore wall in which some of the moveable fluids (e.g. the drilling mud MD) have been displaced by mud filtrate in the permeable geological formation. The terminology "mudcake" corresponds to the shallow layer of solid mud particles resulting from the drilling mud produced during the drilling operation and flatten against the well-bore wall due to high pressure.

Figure 2:
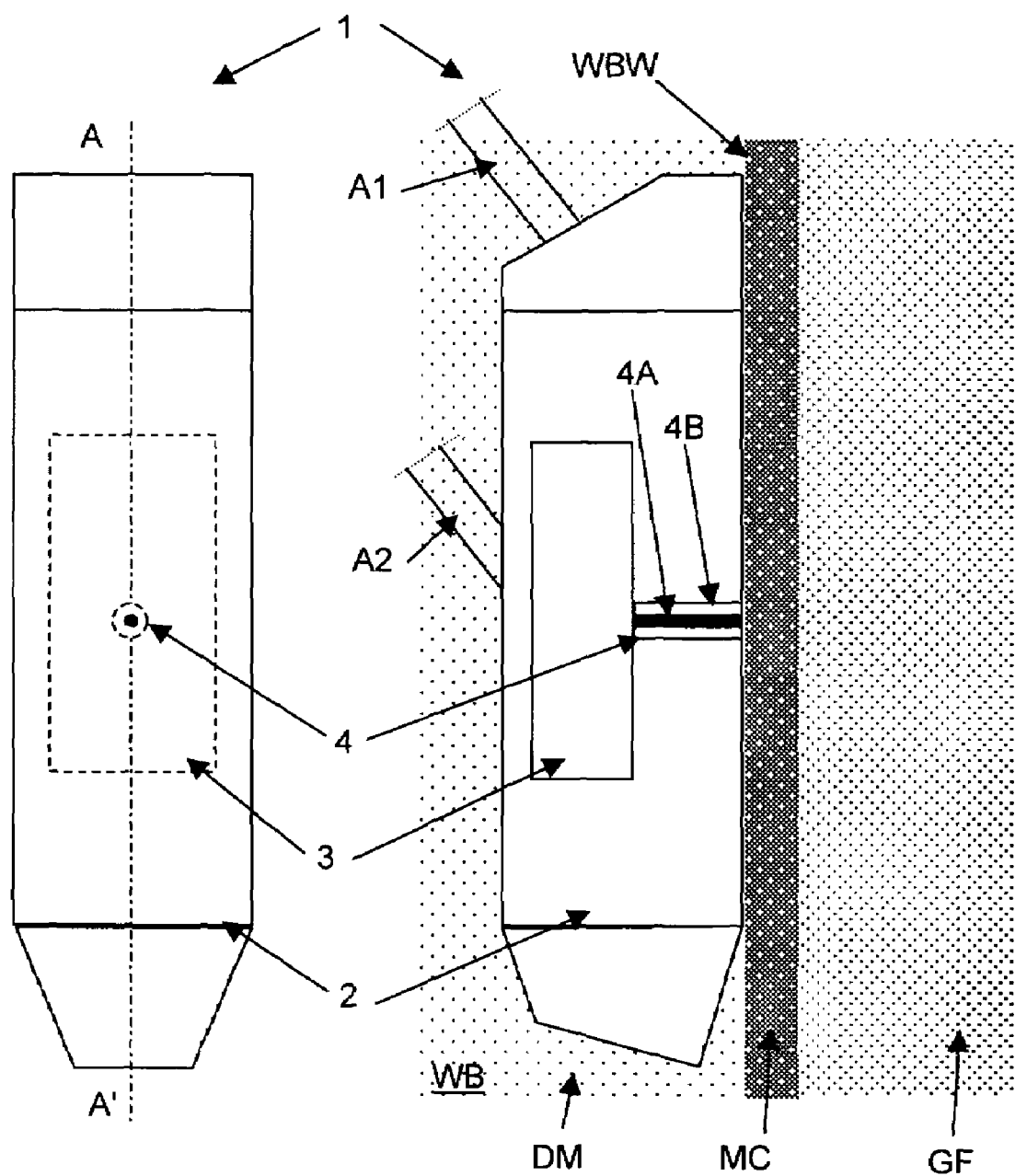
FIGS. 2.A and 2.B schematically show a top view and a cross-section view in a pad comprising a probe according to the invention.

FIGS. 2.A and 2.B respectively show a top cross-section view and a lateral cross-section of the probe 1 of the invention.

The probe 1 comprises a metallic pad 2. The pad 2 can be put in contact with the down-hole material (for example the mudcake MC). The pad is made in a metallic material (for example steel) and has length of a few centimeters. The pad is coupled to the tool TL by two arms A1, A2. The tool TL provides energy, control signals and gathers measurements made by the probe 1. The arms A1, A2 enable the deployment of the probe 1 into the well-bore and against the well-bore wall WBW. The well-bore wall consists in either the formation GF covered by the mudcake MC (a shallow layer of solid mud) or the formation GF itself. The drilling mud DM is present into the well-bore.

In order to determine the dielectric properties of the down-hole material, the pad 2 comprises an open-ended coaxial wire 2. The open-ended coaxial wire 4 is a coaxial wire comprising an inner conductor 4A sunk in an insulator 4B. For example, the open-ended coaxial wire has a diameter of around 4 mm. The open-ended coaxial wire 4 is positioned perpendicularly to the pad axis AA'. The open-ended coaxial wire 4 is connected to the electronic circuit 3. Preferably, the electronic circuit is closed to the open-ended coaxial wire in order to avoid any signal loss and phase shift due to the fact that microwave type signals are involved in the measurement.

The open-ended coaxial wire measurement is based on the principle that the reflected signal produced by the coaxial aperture of the probe is dependent on the sample down-hole material terminating the probe, namely the mudcake, the drilling mud or the formation. The electrical parameters (complex permittivity) of the down-hole material can thus be inferred by measuring the aperture admittance (or reflection coefficient).

The open-ended coaxial wire has a limited sensitivity depth corresponding to about the coaxial-probe radius (for example 1 mm for an open-ended coaxial wire having a diameter around 2 mm). This means that the coaxial probe is sensitive to the bulk electrical property of the material in the close vicinity of the probe.

Preferably, the open-ended coaxial wire is calibrated. Thus, the open-ended coaxial wire is coupled to a self-calibration arrangement.

The operation of the electronic circuit and of the self arrangement will be explained hereinafter in more details.

The open-ended coaxial wire 4 and electronic circuit 3 operate as follows.

The open-ended coaxial wire in the metallic pad is in direct contact with the down-hole material (mudcake, mud or formation). A microwave signal is sent to the coaxial wire aperture, and the complex reflection coefficient $S_{11}$ is measured by the electronic circuit 3.

The complex reflection coefficient $S_{11}$ is only correlated to the dielectric properties of the down-hole material being in contact with the probe. A simple linear inversion process provides the permittivity and conductivity of the down-hole material.

The complex permittivity $\epsilon$ of the down-hole material is $\epsilon=\epsilon'-j\epsilon''$, where $\epsilon''=\sigma/(\omega\epsilon_o)$, $\sigma$ is the down-hole material conductivity and $\omega$ is the angular operating frequency.

The operating frequency $\omega$ can be chosen from around 100 MHz to around 2 GHz, for example 900 MHz.

The open-ended coaxial wire can be modeled as two parallel capacitances having a capacitance of $C=C_L+\epsilon C_o$ where $C_L$ corresponds to the fringe field inside the coaxial wire and $C_o$ is the fringing capacitance due to the field in air.

It is assumed a negligible radiation resistance for the open-ended coaxial wire, which is true at 900 MHz for small open-ended coaxial wire aperture.

The reflection coefficient at the end of the probe is:
$S_{11} = (1-j\omega Z_o C)/(1+j\omega Z_o C)$ where $Z_o$ is the characteristic impedance of the coaxial wire.

In particular, $$Z_o = \frac{60}{\sqrt{\varepsilon_c}} \ln \frac{b}{a}$$

with the coaxial line permittivity $\varepsilon_c$.

Finally, the down-hole material permittivity is given by:

$$\varepsilon = \frac{1}{C_o}\left[\frac{1-S_{11}}{1+S_{11}}\frac{1}{j\omega Z_o} - C_L\right]$$

with CL<<Co.

The value of $C_L$ and $C_o$ are fixed by the open-ended coaxial wire design and do not depend on the down-hole material.

This measurement works over a large range of conductivity (e.g. 0 to 10000 mS/m) and permittivity (e.g. 1 to 81). The measurements accuracy obtained is typically better than 1%.

Figure 3:
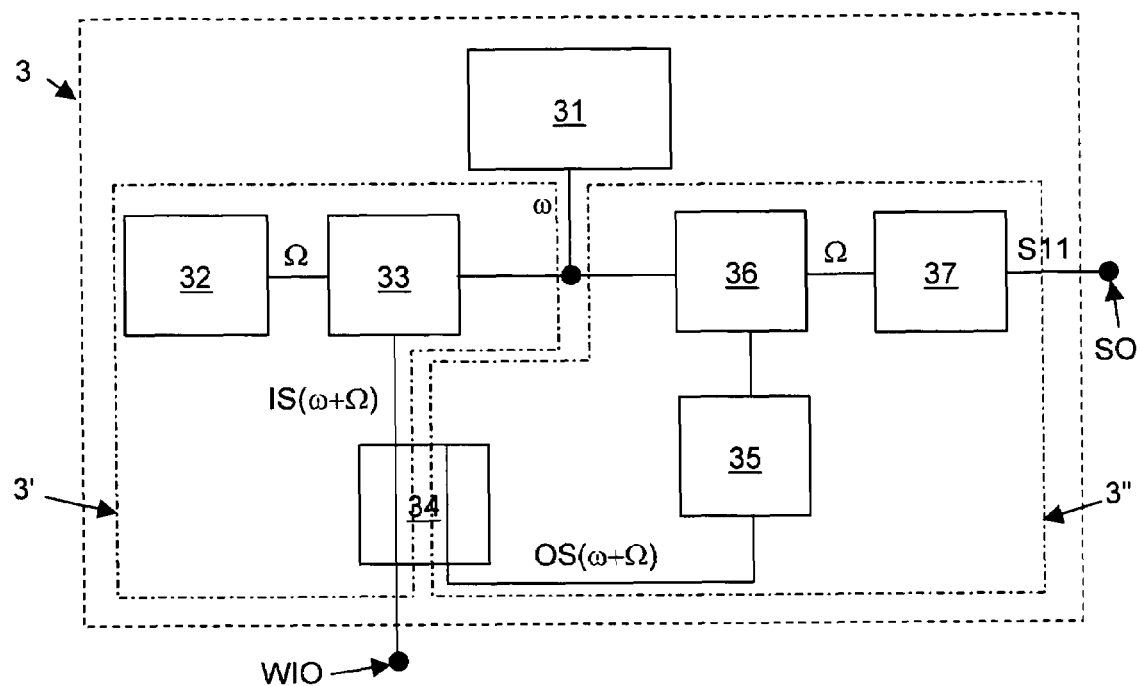
FIG. 3 schematically illustrates in greater details the electronic circuit of the probe of FIGS. 2.A and 2.B.

The FIG. 3 schematically illustrates the electronic circuit 3 of the probe of FIGS. 2.A and 2.B. The electronic circuit 3 comprises an input/output WIO for connecting to the open-ended coaxial wire, and a signal output SO for providing an output signal comprising the information related to a measured amplitude and a measured phase. The usual and known energizing and control circuits are omitted in this Figure.

The electronic circuit 3 comprises an emitting circuit 3' and a receiving circuit 3". The emitting and receiving circuits are both coupled to a high frequency source 31. The emitting circuit 3' comprises a low frequency source 32, a modulator 33 and a directional coupler 34. The receiving circuit 3" comprises the directional coupler 34, an amplifier 35, a mixer 36, and a digitizing and processing module 37.

The high frequency source 31 is coupled to the modulator 33 and to the mixer 36, and provides to these elements a microwave signal of high frequency $\omega_o$ (from around 100 MHz to around 2 GHz—for example 900 MHz). The high frequency source 31 serves as a reference for the receiving circuit 3", in particular the mixer 36. The low frequency source 32 is coupled to the modulator 33 and provides two in-phase and quadrature signals of low frequency $\Omega_o$ (a few kHz—for example 10 kHz). These signals are sent to the modulator 33 comprising an in phase and Quadrature (IQ) modulator performing a frequency offset. The resulting input signal IS having a frequency $\omega_o + \Omega_o$ is provided to the directional coupler 34.

The directional coupler 34 provides the input signal IS to the input/output WIO coupled to the open-ended coaxial wire.

The directional coupler 34 is also coupled to the amplifier 35. The directional coupler 34 provides the output signal OS reflected by the open-ended coaxial wire through the input/output WIO. The output signal OS having a frequency $\omega_o + \Omega_o$ is amplified by the amplifier 35. The resulting amplified output signal having a frequency $\omega_o + \Omega_o$ is provided to the mixer 36.

The mixer 36 which also receives the signal of high frequency $\omega_o$ of the high frequency source 31 provides a signal of low frequency $\Omega_o$ to the digitizing and processing module 37. The signal of low frequency $\Omega_o$ is digitized and processed through a usual synchronous detection scheme. The digitizing and processing module 37 provides a signal to the signal output SO under the form A.cos($\omega t+\phi$), where A and $\phi$ respectively correspond to the amplitude and phase of the complex reflection coefficient $S_{11}$. The gain and phase offset due to the high-frequency electronics chain that may affect the measurements, can be cancelled with a calibration process (described hereinafter).

Then, the down-hole material permittivity and conductivity can be determined as explained hereinbefore either by an appropriate supplementary processing arrangement (not shown) of the electronic circuit, or by an appropriate supplementary processing arrangement (not shown) of the tool TL, or by the surface unit SU. The measured down-hole material permittivity and conductivity may be transmitted to the surface unit for further processing by known transmission method.

The electronic circuit 3 may be designed as a small board (around 10 cm²) integrated in the pad.

In the above described embodiment, the high frequency source provides a determined high frequency signal. Alternatively, the high frequency source can generate high frequency signals of different frequencies so that the frequency of the input signal can be varied. Thus, different measurements can be performed at different frequencies. For example, various measurements of the down-hole material permittivity and conductivity can be performed at a sensibly identical position (preferably the same position) in the well-bore but at various frequencies, e.g one measurement at 100 MHz, one at 500 MHz and one at 1 GHz. A dispersion curve can be calculated based on these measurements. The analysis of the dispersion curve may give various information on the petrophysical parameters of the down-hole material (e.g. formation particle shape, formation particle wettability, etc. . . . ).

Figure 4:
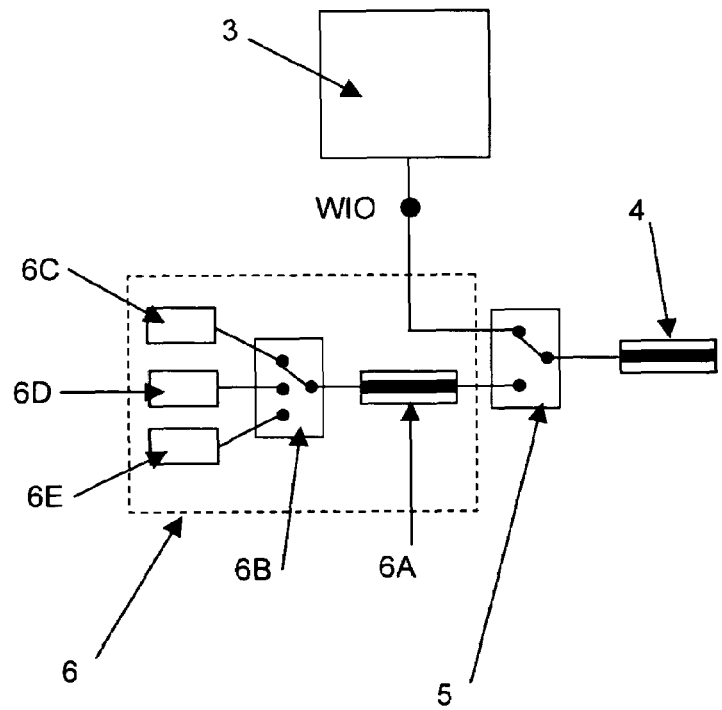
FIG. 4 schematically illustrates a self-calibration arrangement adapted for the probe according to the invention.

The accuracy of the probe may be affected by the temperature drift of the electronic circuit 3. An accuracy of the electronic circuit 3 of at least 0.05 dB in amplitude and 0.1 deg in phase can be obtained by coupling through a first switch 5 the electronic circuit 3 to a self-calibration arrangement 6 as shown in FIG. 4. The calibration arrangement 6 is used to calibrate the electronic circuit 3 and the open-ended coaxial wire 4. At determined time intervals, for example from time to time or systematically before each measurement, the electronic circuit 3 launches an automatic calibration proceeding.

The self-calibration arrangement 6 comprises a second coaxial wire 6A, a second switch 6B and a short termination 6C, an open termination 6D and a 50 Ohm termination 6E.

The second coaxial wire 6A is identical to the open-ended coaxial wire 4 and compensates for the probe length and losses.

The self calibration operates as follows. Firstly, the electronic circuit 3 is coupled to the self-calibration arrangement 6 by means of the switch 5 through the input/output WIO. Subsequently, the electronic circuit 3 sends and receives a signal through the second coaxial wire 6A and to the short termination 6C, then to the open termination 6D and finally to the 50 Ohm termination 6E by successive action of the second switch 6B. For each termination measurement, a reflection coefficient is determined and a new calibration curve is calculated with these measurements.

This calibration is particularly well adapted for a tool that is run down-hole. This automatic calibration avoids a calibration in laboratory and automatically corrects the drift in the electronics and in the open-ended coaxial wire.

The three terminations are not necessarily the short termination, the open termination and the 50 Ohm termination. Alternatively, the three terminations can be different in order to only cover the impedance range of the open-ended coaxial wire.

The hereinbefore description focused on the particular application of the invention to a wire-line logging tool. Nevertheless, it will be apparent for a man skilled in the art that the probe of the invention can be easily adapted to logging while drilling application (see background of the invention).

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A probe (1) for measuring the electromagnetic properties of a down-hole material (MC, GF, DM) of a well-bore (WB), the probe comprising a metallic pad (2) in contact with the down-hole material,
wherein the pad (2) further comprises an open-ended coaxial wire (4) coupled to an electronic circuit (3), said open-ended coaxial wire (4) comprising an inner conductor (4A) sunk in an insulator (4B) and being positioned sensibly perpendicularly to a well-bore wall, the electronic circuit (3) being able to send a high-frequency input signal into the open-ended coaxial wire (4) and to determine a reflection coefficient based on a high-frequency output signal reflected by the open-ended coaxial wire (4).

2. A probe (1) according to claim 1, wherein the down-hole material is a mudcake (MC) or a geological formation (GF) or a drilling mud (DM).

3. A probe (1) according to claim 1 or 2, wherein the open-ended coaxial wire (4) and the electronic circuit (3) are coupled to a self-calibration arrangement (6) by means of a first switch (5).

4. A probe (1) according to claim 3, wherein the self-calibration arrangement (6) comprises a second coaxial wire (6A) sensibly identical to the open-ended coaxial wire (4), the second coaxial wire (6A) being connected by a second switch (6B) to a first termination (6C) having a first impedance, a second termination (6D) having a second impedance and a third termination (6E) having a third impedance.

5. A probe (1) according to claim 4, wherein the first termination (6C) is a short termination, the second termination (6D) is an open termination and the third termination (6E) has a determined impedance.

6. A method for measuring the electromagnetic properties of a down-hole material (MC, GF, DM) of a well-bore (WB), wherein the method comprising the steps of:
positioning an open-ended coaxial wire (4) in contact with the down-hole material,
sending a high-frequency input signal into the open-ended coaxial wire (4) in contact with the down-hole material,
measuring a high-frequency output signal reflected by the open-ended coaxial wire (4),
measuring a reflection coefficient ($S_{11}$) based on the high-frequency output signal,
calculating a dielectric value ($\epsilon$, $\sigma$) related to the down-hole material (MC, GF, DM), and
repeating the above steps at different points along the well-bore wall.

7. A method according to claim 6, wherein a further calibration step of an electronic circuit (3) coupled to the open-ended coaxial wire (4) is performed at a determined time interval.

8. A method according to claim 7, wherein the calibration step consists in successively connecting the electronic circuit to at least three different impedances and measuring the reflected high-frequency output signal.

9. A method according to claim 6, wherein the method further consists in repeating the input signal sending step, the output signal and reflection coefficient measuring steps and the dielectric value calculating step at least for an input signal of another high-frequency at a sensibly identical point along the well-bore wall.

10. A logging tool (TL) wherein the logging tool comprises:
a probe (1) for measuring the electromagnetic properties of a down-hole material (MC, GF, DM) of a well-bore (WB), the probe comprising:
○ a metallic pad (2) in contact with the down-hole material, wherein the pad (2) further comprises an open-ended coaxial wire (4) coupled to an electronic circuit (3), said open-ended coaxial wire (4) comprising an inner conductor (4A) sunk in an insulator (4B) and being positioned sensibly perpendicularly to a well-bore wall, the electronic circuit (3) being able to send a high-frequency input signal into the open-ended coaxial wire (4) and to determine a reflection coefficient based on a high-frequency output signal reflected by the open-ended coaxial wire (4)
wherein the pad (2) of the probe (1) is coupled to the tool (TL) by at least one arm (A1, A2), said logging tool (TL) receiving a signal representative of the electromagnetic properties of the down-hole material (MC, GF, DM) measured by the probe (1).

11. The logging tool according to claim 10, wherein the down-hole material is a mudcake (MC) or a geological formation (GF) or a drilling mud (DM).

12. The logging tool according to claim 10, wherein the open-ended coaxial wire (4) and the electronic circuit (3) are coupled to a self-calibration arrangement (6) by means of a first switch (5).

13. The logging tool according to claim 12, wherein the self-calibration arrangement (6) comprises a second coaxial wire (6A) sensibly identical to the open-ended coaxial wire (4), the second coaxial wire (6A) being connected by a second switch (6B) to a first termination (6C) having a first impedance, a second termination (6D) having a second impedance and a third termination (6E) having a third impedance.

14. The logging tool according to claim 13, wherein the first termination (6C) is a short termination, the second termination (6D) is an open termination and the third termination (6E) has a determined impedance.

* * * * *